(12) United States Patent
Shiimoto et al.

(10) Patent No.: US 9,406,315 B2
(45) Date of Patent: Aug. 2, 2016

(54) AF-MODE STO WITH NEGATIVE HK SPIN POLARIZATION LAYER

(71) Applicant: HGST Netherlands B.V., Amsterdam (NL)

(72) Inventors: Masato Shiimoto, Odawara (JP); Masukaza Igarashi, Kawagoe (JP); Keiichi Nagasaka, Isehara (JP); Yo Sato, Odawara (JP)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 14/179,358

(22) Filed: Feb. 12, 2014

(65) Prior Publication Data
US 2015/0228295 A1    Aug. 13, 2015

(51) Int. Cl.
G11B 5/235    (2006.01)
G11B 5/31     (2006.01)
G11B 5/127    (2006.01)
G11B 5/00     (2006.01)

(52) U.S. Cl.
CPC .............. G11B 5/1278 (2013.01); G11B 5/235 (2013.01); G11B 5/3146 (2013.01); G11B 2005/0024 (2013.01)

(58) Field of Classification Search
CPC ............................................... G11B 2005/0024
See application file for complete search history.

(56) References Cited

U.S. PATENT DOCUMENTS

| 8,184,411 | B2 | 5/2012 | Zhang et al. |
| 8,274,811 | B2 | 9/2012 | Zhang et al. |
| 8,279,548 | B2 | 10/2012 | Tsuchiya et al. |
| 8,300,356 | B2 | 10/2012 | Zhang et al. |
| 2011/0216435 | A1* | 9/2011 | Shiimoto et al. ................ 360/59 |

(Continued)

OTHER PUBLICATIONS

Masato Matsubara et al.; "Experimental Feasibility of Spin-Torque Oscillator with Synthetic Field Generation Layer for Microwave Assisted Magnetic Recording"; Journal of Applied Physics; vol. 109, Issue 7; Mar. 2011.

(Continued)

*Primary Examiner* — Craig A. Renner
(74) *Attorney, Agent, or Firm* — Patterson & Sheridan, LLP (57) ABSTRACT

The embodiments disclosed generally relate to an STO structure for a magnetic head. The STO structure has an FGL having a greater thickness than the SPL. The SPL may have multiple layers. In one embodiment, a MAMR head comprises a main pole; a trailing shield; and an STO coupled between the main pole and the trailing shield. The STO includes: a first magnetic layer having a first thickness; a non-magnetic spacer layer coupled to the first magnetic layer; and a second magnetic layer having a second thickness and coupled to the non-magnetic spacer layer, wherein the first thickness is greater than the second thickness, wherein a current is charged from the first magnetic layer to the second magnetic layer, and wherein a vertical magnetic anisotropy field of the second magnetic film is less than 0 kOe.

15 Claims, 8 Drawing Sheets

(56) References Cited

U.S. PATENT DOCUMENTS

| | | | |
|---|---|---|---|
| 2011/0228423 A1* | 9/2011 | Koui et al. | 360/75 |
| 2012/0002331 A1 | 1/2012 | Oikawa et al. | |
| 2012/0113543 A1* | 5/2012 | Shiimoto et al. | 360/75 |
| 2013/0050866 A1 | 2/2013 | Matsubara et al. | |
| 2013/0050869 A1 | 2/2013 | Nagasaka et al. | |
| 2013/0070367 A1 | 3/2013 | Igarashi et al. | |
| 2013/0082787 A1 | 4/2013 | Zhang et al. | |
| 2013/0222941 A1* | 8/2013 | Sugiura et al. | 360/75 |
| 2013/0279039 A1* | 10/2013 | Shiroishi | 360/48 |
| 2013/0335847 A1* | 12/2013 | Shiroishi | 360/46 |
| 2014/0139952 A1* | 5/2014 | Takeo et al. | 360/125.03 |

OTHER PUBLICATIONS

K. Yoshida et al, "Spin Torque Oscillator With Negative Magnetic Anisotropy Materials for MAMR"; IEEE Transactions on Magnetics; vol. 46, Issue 6; Jun. 2010, 1 Page Abstract Only.

J.C. Slonczewski; "Current-Driven Excitation of Magnetic Multilayers"; IBM Research Division, Thomas J. Watson Research Center, Journal of Magnetism and Magnetic Materials, vol. 159, pp. L1-L7, Jun. 1996.

Jian-Gang Zhu et al. "Microwave Assisted Magnetic Recording"; IEEE Transaction on Magnetics; vol. 44, No. 1; Jan. 2008, pp. 125-131.

* cited by examiner

AF-MODE STO WITH NEGATIVE HK SPIN POLARIZATION LAYER

BACKGROUND OF THE INVENTION

1. Field of the Invention

Embodiments disclosed herein generally relate to the structure of a vertical recording head used in a magnetic disk device.

2. Description of the Related Art

Microwave-assisted magnetic recording (MAMR) has been studied in recent years as a recording method for improving surface density. In MAMR, exerting a magnetic field by a main pole applies an AC field from a spin-torque oscillator (STO) to a medium. Applying an AC field to a medium reduces the coercivity of the medium, which facilitates high-quality recording. Therefore, an important issue for MAMR is to develop an STO which generates a sufficiently large AC field.

Figure 1:
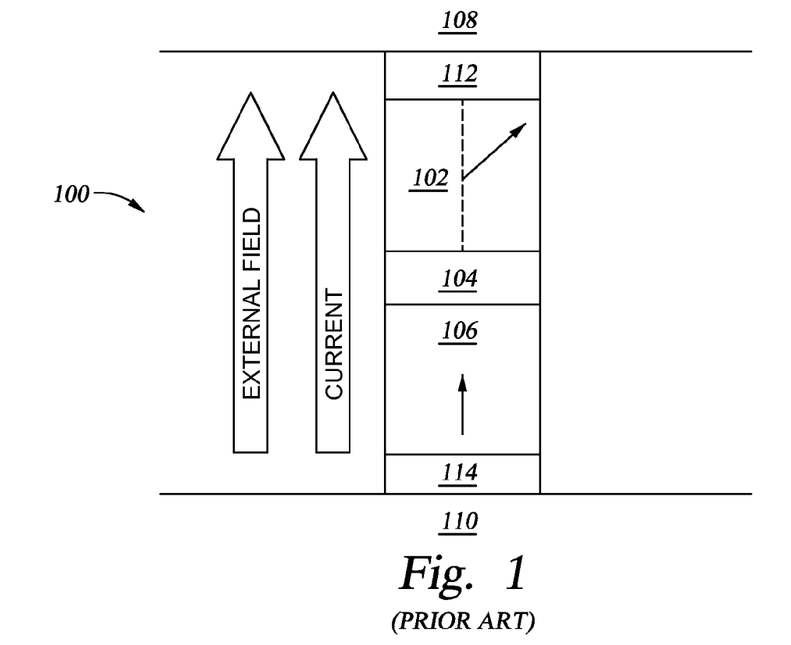
FIG. 1 is a schematic illustration of a prior art T-mode STO structure.

With the STO structure 100 shown in FIG. 1, the STO 100 comprises a field generation layer (FGL) 102 for generating an AC field, a spacer 104, and a spin polarization layer (SPL) 106 for transmitting spin-polarized torque. The STO 100 is disposed between the trailing shield 108 and main pole 110 with a cap layer 112 and underlayer 114 present as well. A material having strong vertical anisotropy energy is used for the SPL 106. The STO 100 is also charged by a current from the SPL 106 toward the FGL 102. During this charging, a spin torque oriented in the same direction as the magnetization of the FGL 102 acts on the magnetization of the SPL 106, and a spin torque oriented in the antiparallel direction to the magnetization of the SPL 106 acts on the magnetization of the FGL 102. Because a perpendicular field is applied to the STO 100, the magnetization of the SPL 106 is stable vertically. The magnetization of the FGL 102, however, oscillates in a state having a large in-plane component. Oscillation of the STO 100 in this structure is called T-mode oscillation because the SPL 106 and the FGL 102 oscillate in a T-shape.

Figure 2:
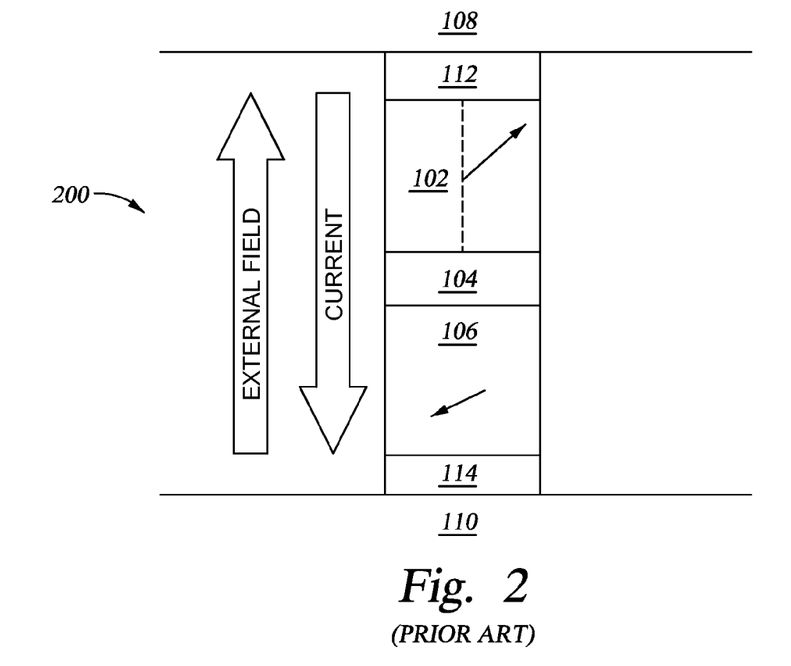
FIG. 2 is a schematic illustration of a prior art AF-mode STO structure.

A different STO structure 200 is shown in FIG. 2 where the STO 200 comprises an FGL 102 for generating an AC field, a spacer 104, and an SPL 106 for transmitting a spin-polarized torque. The STO 200 is disposed between the trailing shield 108 and main pole 110 with a cap layer 112 and underlayer 114 present as well. The points of difference from FIGS. 1 and 2 otherwise are that the magnetization of the SPL 106 is effectively oriented in the in-plane direction of the film, and both the FGL 102 and the SPL 106 oscillate. Specifically, a current is charged from the FGL 102 toward the SPL 106, and a structure is used in which the SPL 106 has a thin film thickness and a vertical anisotropy field of about several kOe such that the anisotropy field of the SPL 106 is effectively zero. Because the SPL 106 receives a spin torque in the antiparallel direction to the FGL 102 and the FGL 102 receives a spin torque in the parallel direction to the SPL 106 when a current is charged from the FGL 102 to the SPL 106 in this structure, the SPL 106 and the FGL 102 readily oscillate together in-plane, which can generate a high AC field. This structure has the useful feature for high-speed transfer recording that the FGL 102 inverts quickly because inversion of the magnetization of the SPL 106 is not delayed by switching the polarity of the write head field. Oscillation of the STO 200 in this structure is called AF-mode oscillation because the SPL 106 and the FGL 102 oscillate while maintaining an antiparallel state.

The most important feature demanded of an STO is to generate a high AC field. For this purpose, increasing the spin torque acting on the FGL is effective. Since the size of the spin torque is inversely proportional to the density of the current to the STO, increasing the application current obtains higher AC field strength. Too high a charging current, however, increases the temperature of the STO, which increases the probability of failure. Therefore, there is a demand for development of an STO film capable of generating a high AC field by as low a current as possible.

SUMMARY OF THE INVENTION

The embodiments disclosed herein generally relate to an STO structure for a magnetic head. The STO structure has an FGL having a greater thickness than the SPL. The SPL may have multiple layers.

In one embodiment, a MAMR head comprises a main pole; a trailing shield; and an STO coupled between the main pole and the trailing shield. The STO includes: a first magnetic layer having a first thickness; a non-magnetic spacer layer coupled to the first magnetic layer; and a second magnetic layer having a second thickness and coupled to the non-magnetic spacer layer, wherein the first thickness is greater than the second thickness, wherein a current is charged from the first magnetic layer to the second magnetic layer, and wherein a vertical magnetic anisotropy field of the second magnetic film is less than 0 kOe.

BRIEF DESCRIPTION OF THE DRAWINGS

So that the manner in which the above recited features can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Figure 3:
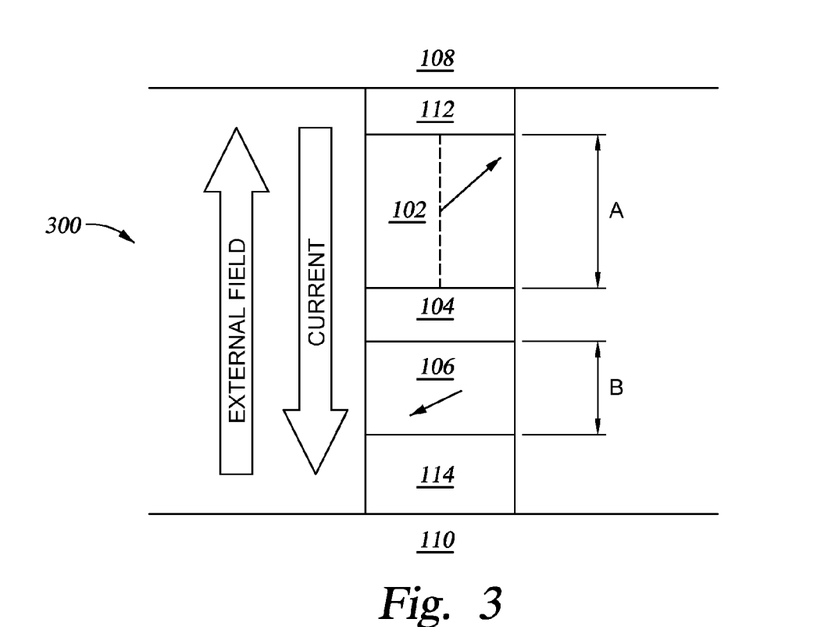
FIG. 3 is a schematic illustration of a AF-mode STO structure according to one embodiment.

FIG. 3 shows a schematic view of an STO structure 300 according to one embodiment. The STO 300 is arranged between the main pole 110 and the trailing shield 108 of a magnetic head, but structural parts other than the STO 300 have been omitted. The STO 300 comprises a first magnetic layer (SPL 106) having a negative magnetic anisotropy axis vertical to the film surface, a nonmagnetic spacer 104 (anti-ferro coupling spacer), and a magnetic layer (FGL 102) effectively having a plane of easy magnetization in the film surface. The structure of the embodiments disclosed is an STO 300 which produces AF-mode oscillation, in which a current charges the STO 300 from the FGL 102 to the SPL 106, and the SPL 106 has a thinner film thickness as shown by arrow "B" than the FGL 102 as shown by arrow "A". The greatest feature of the embodiments disclosed is that the vertical magnetic anisotropy field of the SPL 106 is less than 0 kOe. High AC field strength is also obtained by the following structure. The vertical magnetic anisotropy field of the SPL is −16 kOe to less than 0 kOe. The SPL comprises the following materials: [$Fe_a/Co_b$]n multilayer film (a/b=0.25-4, a+b=1.5-40 Å); $Co_{1-x}Ir_x$ (x=8-38 at %); and $Fe_{1-y}C_y$ (y=1.5-8 at %). Additionally, the materials described in Tables 1, 2, 3, and 4 may be used. The film thickness of the SPL is between 0.6 nm to 4 nm. The material of the FGL is a single layer or a laminate structure containing a CoFe alloy.

Figure 4:
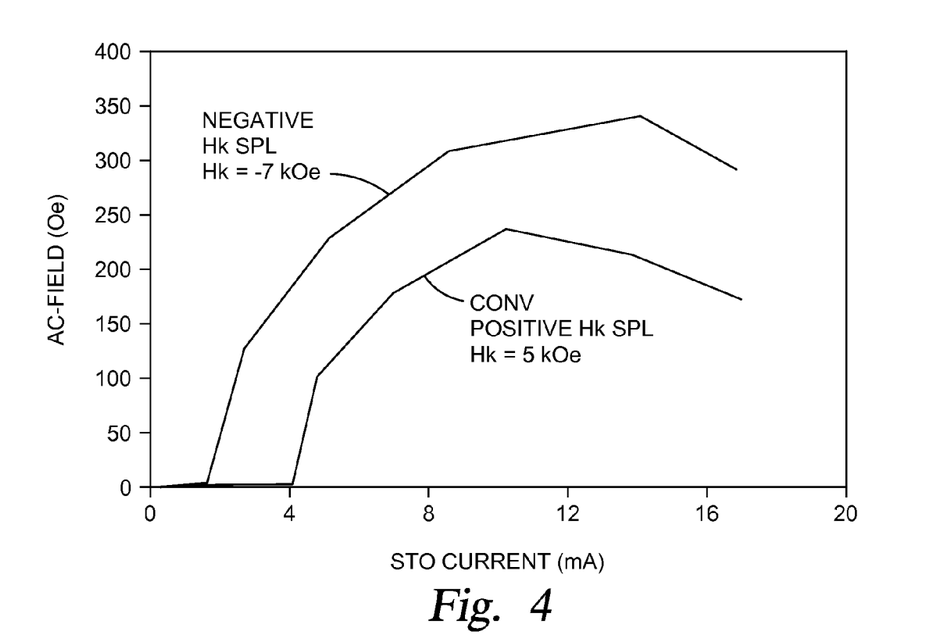
FIG. 4 is a graph illustrating the AC field vs. STO current.
Figure 5:
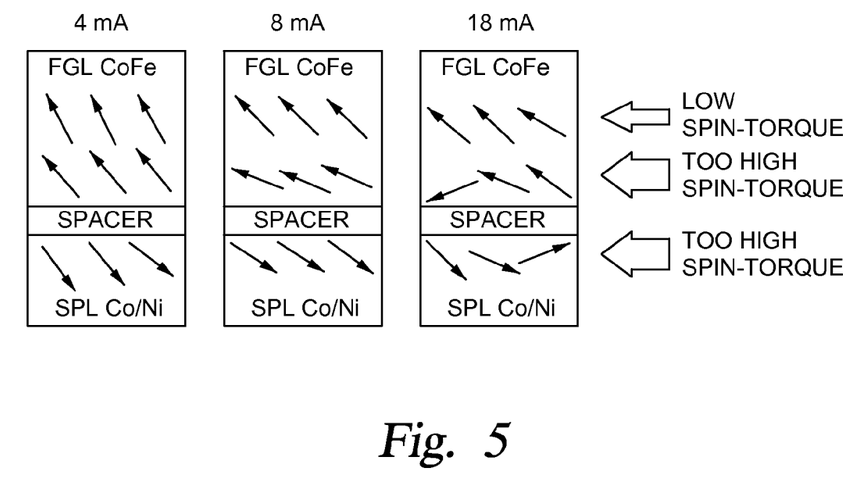
FIG. 5 is a schematic illustration of the magnetization configuration for a conventional STO.

FIG. 4 shows the relationship between AC field strength and application current in an AF-mode STO structure using CoFe in the FGL, and FIG. 5 shows the state of magnetization of the FGL and the SPL, as viewed from the side opposite the medium, when the charging current is 4, 8, and 18 mA. The state of magnetization is the result of a micromagnetic simulation numerical calculation. FIG. 4 reveals that increasing the current charging the STO increases AC field strength, but too high a charging current attenuates AC field strength. Although a charging current to the STO of 4 mA generates hardly any AC field because the in-plane component of magnetization of the FGL and the SPL is small, a charging current of 8 mA increases the in-plane component and generates an AC field. A charging current of 18 mA, however, reduces the AC field strength because the state of magnetization exhibits multi domains due to supplying too much spin torque to the FGL and the SPL on the spacer boundary side. Therefore, it is demanded that an STO having an AF-mode structure have a capacity to generate an AC field by as low an electrodynamic force as possible, and minimize multi domains of the FGL and the SPL even when a high current is applied. The disclosed embodiments solve these problems by providing an STO capable of generating a high AC field strength by a low current. Therefore, one key to improving the strength of the AC field generated by the STO is to equalize the size of the spin torque inside the FGL. Making the size of the spin torque acting in the FGL of an STO uniform can provide an STO obtaining high AC field strength.

FIG. 4 shows results of assessing the AC field of an MAMR head on which the STO has been mounted. The STO 300 is the structure shown in FIG. 3, and the SPL 106 has a Bs of 2.35 T and an Hk of −7 kOe. The SPL material is the [$Co_3/Fe_7$]$_3$ described in Table 1 below. The Co/Fe ratio is a/b=0.25~0.4 and the period is a+b=1.5~40 (Å).

TABLE 1

| Material | Bs (T) | Ms (emu/cc) | Hk (kOe) | Ku ($10^{-6}$ erg/cc) |
| --- | --- | --- | --- | --- |
| [$Co_2/Fe_8$]$_3$ | 2.32 | 1846 | −3.0 | −2.8 |
| [$Co_3/Fe_7$]$_3$ | 2.35 | 1868 | 7.0 | 6.5 |
| [$Co_4/Fe_6$]$_3$ | 2.35 | 1868 | −10.0 | −9.3 |
| [$Co_6/Fe_4$]$_3$ | 2.34 | 1865 | −12.0 | −11.2 |
| [$Co_7/Fe_3$]$_3$ | 2.30 | 1829 | −9.0 | −8.2 |
| [$Co_8/Fe_2$]$_3$ | 2.22 | 1770 | −7.0 | −6.2 |

This material is a laminated structure of seven periods of 3-Å Co and 8-Å Fe, and has a film thickness of 3 nm. As is clear from FIG. 4, the structure disclosed, in which a negative vertical anisotropy material is applied for the SPL 106, reduces the current required to generate AC field strength to 2 mA from the 4 mA of a structure using a positive vertical magnetic anisotropy material having an Hk of 5 kOe. Under the conditions that a large current of about 10 mA has been applied, the AC field strength achievable by the structure is about 320 Oe, or greatly improved over about 230 Oe by a conventional structure.

Figure 6:
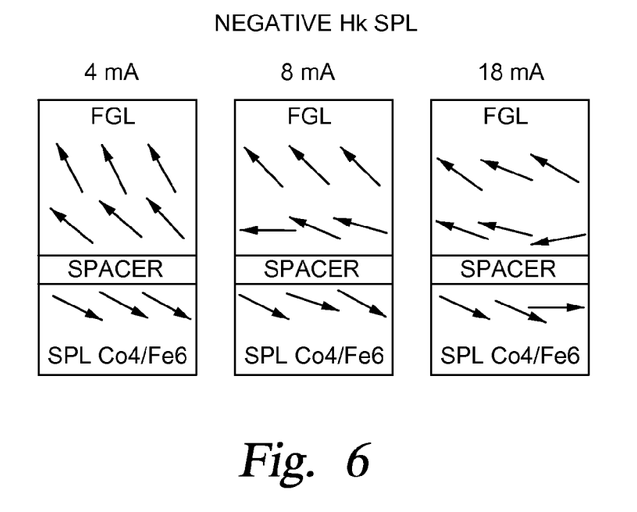
FIG. 6 is a schematic illustration of the magnetization configuration for an STO according to one embodiment.
Figure 7:
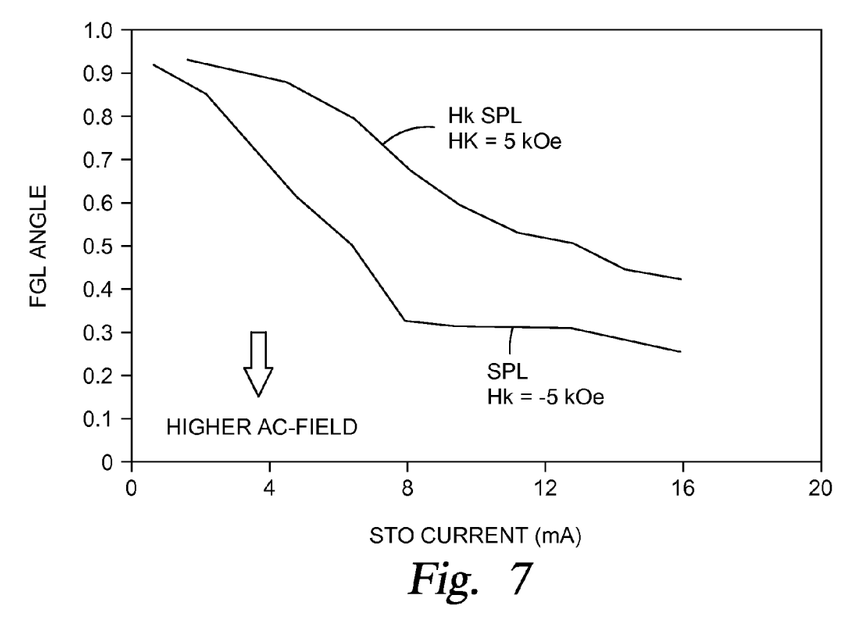
FIG. 7 is a graph illustrating the FGL angle vs. STO current.
Figure 8:
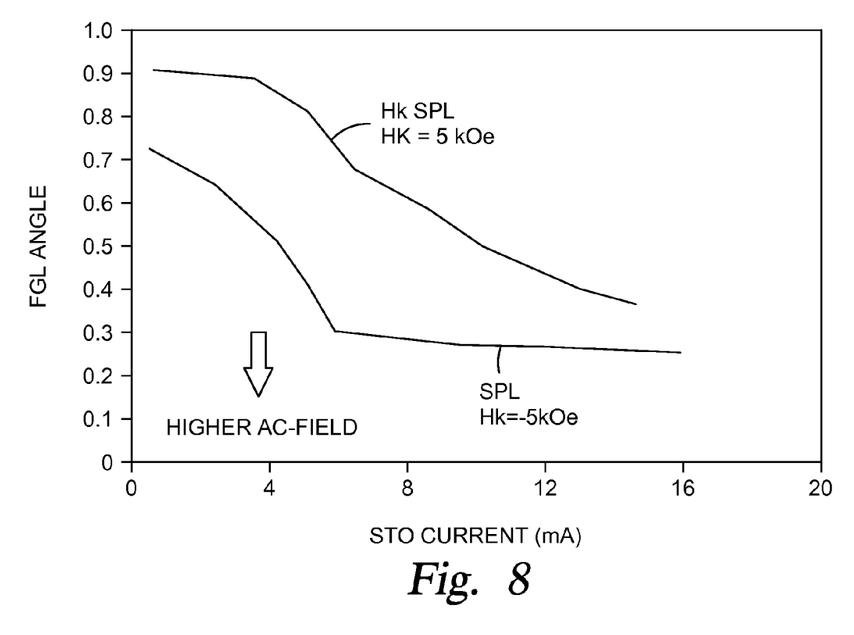
FIG. 8 is a graph illustrating the SPL angle vs. STO current.

The reason that applying a negative vertical anisotropy field material for the SPL 106 improves AC field strength will be indicated hereinafter. FIG. 6 shows the state of magnetization of the SPL 106 and the FGL 102 when the charging current to the STO 300 of the example is 4, 8, and 14 mA, and FIGS. 7 and 8 show the dependency of the angle of magnetization of the FGL 102 and the SPL 106 on the STO current in the example of the structure and an example of a conventional structure. The angle of magnetization of the FGL 102 and the SPL 106 is 90 deg vertically to the plane and 0 deg in the in-plane direction. Therefore, AC field strength becomes stronger as the angle of magnetization of the FGL approaches 0 deg. First, when the example of FIG. 6 is compared to the state of magnetization of the SPL 106 in the conventional example of FIG. 5, the example has a larger in-plane component of magnetization for both the FGL 102 and the SPL 106. This means that the example of the disclosed embodiments can generate an AC field by a low current. Because AF-mode oscillation occurs, in which the FGL 102 and the SPL 106 oscillate in an antiparallel state, the magnetization of the SPL 106 must first collapse in-plane. As is clear from the angle of magnetization of the SPL 106 in FIG. 8, the angle of magnetization of the SPL 106 is small even when the STO 300 current is small because the SPL 106 in the example disclosed has a negative vertical anisotropy field. As shown in FIGS. 7 and 8, as the angle of magnetization of the SPL 106 becomes smaller, the angle of magnetization of the FGL 102 also becomes smaller, and an AC field is generated. Therefore, the example of the disclosed embodiments can generate an AC field even by a low application current to the STO 106.

Figure 9:
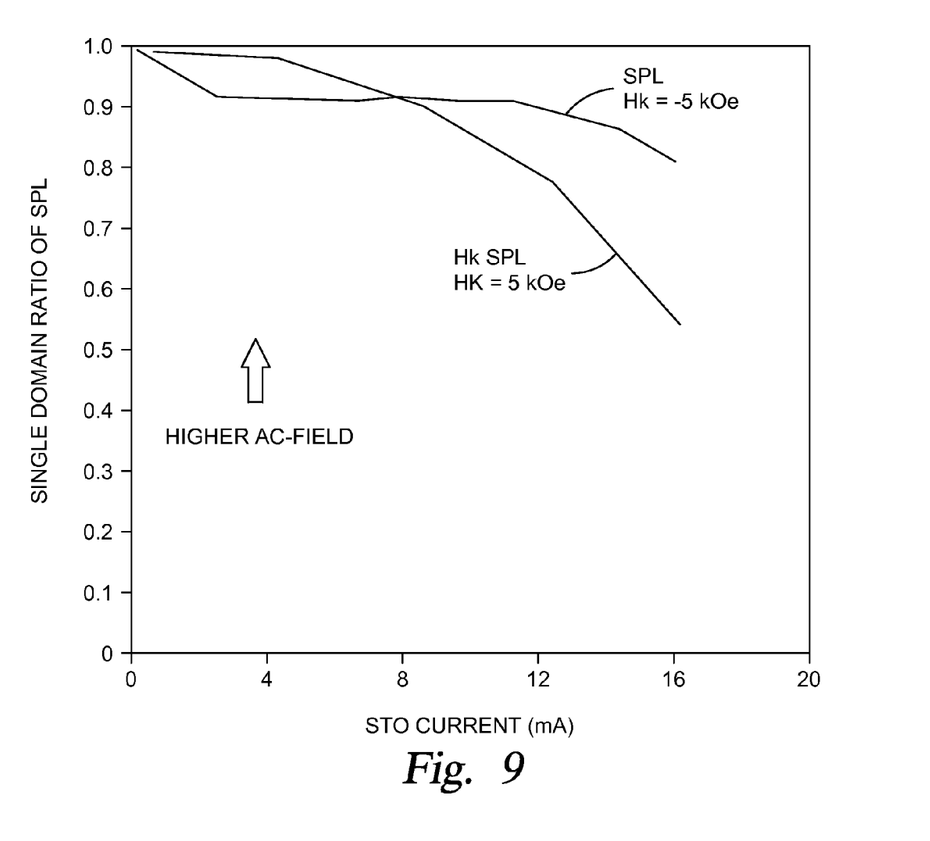
FIG. 9 is a graph illustrating a single domain ratio of SPL vs. STO current.

Another advantage of applying a negative vertical anisotropy field material for the SPL 106 is that magnetization of the SPL 106 resists become multi domains because the SPL 106 is bound in-plane by a negative vertical anisotropy field even when the charging current to the STO 300 is large and the SPL 106 receives a spin torque. FIG. 9 shows the dependency of the single domain ratio of the SPL 106 on the STO 300 current in an example of the structure and an example of a conventional structure. The single domain ratio of the SPL 106 is an indicator of uniformity of magnetization. The FGL 102 becomes more stable as the single domain ratio of the SPL 106 increases, and therefore a higher AC field strength can be generated. As is clear from FIG. 9, where the single domain ratio of the SPL 106 in the conventional example is significantly decreased by increasing the charging current to the STO, increasing the STO current in the example disclosed produces little reduction in the single domain ratio. Therefore, the example of the disclosed embodiments can minimize the FGL 102 becoming multi domains, which causes the SPL 106 to become multi domains, even when the STO current is high, and as a result, can realize high AC field strength.

Figure 10:
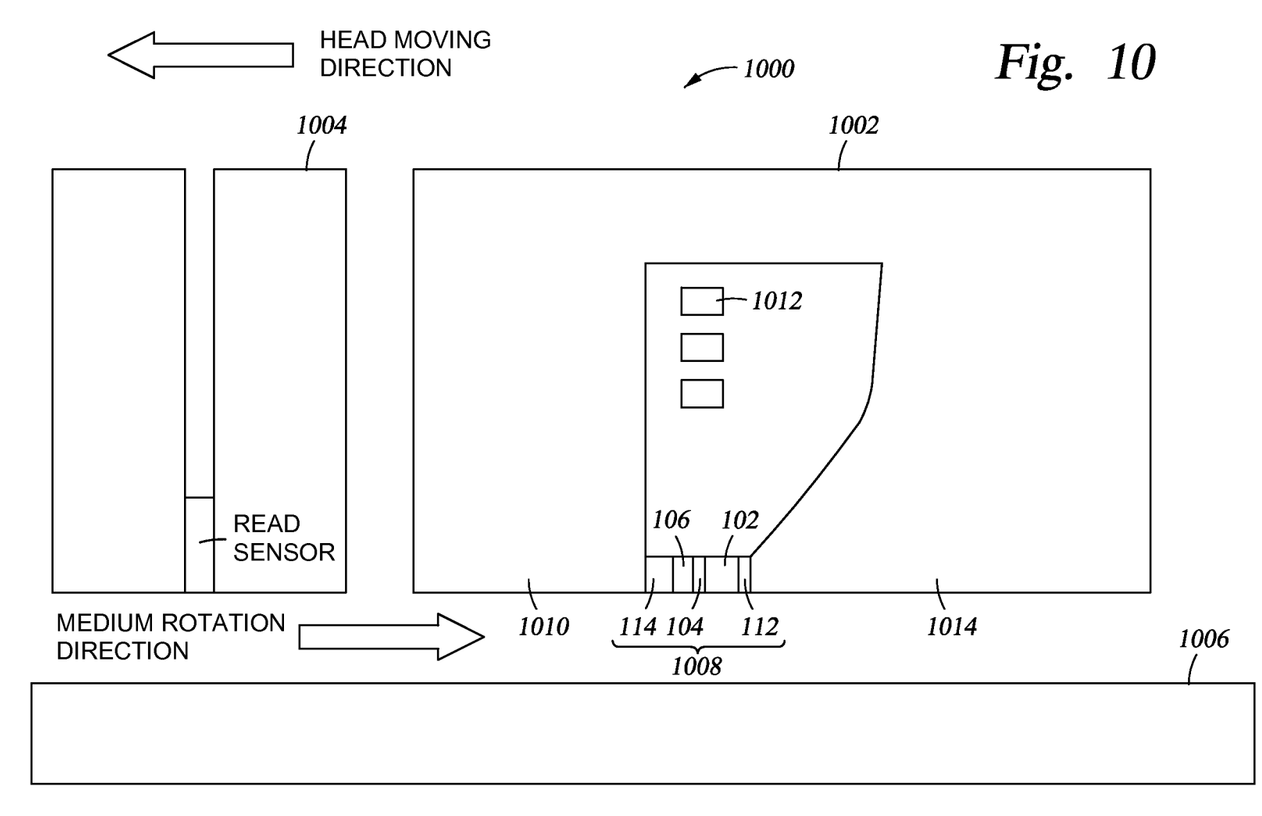
FIG. 10 is a schematic illustration of a MAMR head structure according to one embodiment.

FIG. 10 shows a detail view of an example of the structure according to one embodiment. A magnetic recording and reproducing head 1000 comprises a recording head (writer) 1002 and a reproducing head (reader) 1004. The reproducing head 1004 must be able to reproduce information recorded on a magnetic recording medium 1006. The recording head 1002 comprises an STO 1008 for generating an AC field, a main pole 1010 for generating a recording head field, a coil 1012 for exciting a magnetic field in the main pole 1010, and a trailing shield 1014. Although not shown in FIG. 10, a side shield may be disposed on the outside of the main pole 1010 in the track width direction. Although not a part of the structure of the disclosed embodiment, a magnetic recording medium 1006 is shown in the drawing for reference. The structure of the STO 1008 is the structure shown in FIG. 3, and the materials of the SPL 106 may be selected arbitrarily from among the materials described in Tables 1, 2, 3, and 4. Table 2 has a Co/Fe ratio of a/b=0.25~0.4 and a period of a+b=1.5~40 (Å). Table 3 shows $Co_{1-x}Ir_x$ where x is 8~38 atomic percent. Table 4 shows $Fe_{1-x}C_x$ where x=1.5~8 atomic percent.

TABLE 2

| Material | Bs (T) | Ms (emu/cc) | Hk (kOe) | Ku ($10^{-6}$ erg/cc) |
|---|---|---|---|---|
| $[Co_{0.75}/Fe_{0.75}]_{20}$ | 2.40 | 1910 | −2.6 | −2.5 |
| $[Co_{3.5}/Fe_{3.5}]_4$ | 2.33 | 1854 | −7.0 | −6.5 |
| $[Co_5/Fe_5]_4$ | 2.35 | 1870 | −10.0 | −9.4 |
| $[Co_{7.5}/Fe_{7.5}]_2$ | 2.26 | 1798 | −4.0 | −3.6 |
| $[Co_{10}/Fe_{10}]_2$ | 2.20 | 1751 | −2.5 | −2.2 |
| $[Co_{15}/Fe_{15}]_2$ | 2.08 | 1655 | −1.2 | −1.0 |
| $[Co_{20}/Fe_{20}]_1$ | 2.04 | 1623 | −0.8 | −0.6 |

TABLE 3

| Material | Bs (T) | Ms (emu/cc) | Hk (kOe) | Ku ($10^{-6}$ erg/cc) |
|---|---|---|---|---|
| $Co_8Ir_{92}$ (at %) | 1.51 | 1200 | 0.0 | 0.0 |
| $Co_{15}Ir_{85}$ (at %) | 1.38 | 1100 | −7.3 | −4.0 |
| $Co_{22}Ir_{78}$ (at %) | 1.13 | 900 | −13.3 | −6.0 |
| $Co_{34}Ir_{66}$ (at %) | 0.88 | 700 | −10.0 | −3.5 |
| $Co_8Ir_{62}$ (at %) | 0.63 | 500 | −8.0 | −2.0 |

TABLE 4

| Material | Bs (T) | Ms (emu/cc) | Hk (kOe) | Ku ($10^{-6}$ erg/cc) |
|---|---|---|---|---|
| $Fe_{93.5}C_{1.5}$ (at %) | 2.10 | 1671 | −1.6 | −1.3 |
| $Fe_{96}C_4$ (at %) | 2.10 | 1671 | −2.2 | −1.8 |
| $Fe_{94}C_4$ (at %) | 2.10 | 1671 | −3.1 | −2.6 |
| $Fe_{92}C_8$ (at %) | 2.10 | 1671 | −2.8 | −2.3 |

The recording head in the example of a structure will be described in detail hereinafter. The following structural example is one example, and the effects of the disclosed embodiments are not specifically limited with respect to features other than the SPL 106. The STO 1008 comprises an under layer 114, an SPL 106, a nonmagnetic spacer 104, an FGL 102, and a cap layer 112 in this order from the main pole 1010 side. In the present structural example, the under layer 114 is 2-nm Ta, the cap layer 112 is 2-nm Cr, and the nonmagnetic spacer 104 is 3-nm Cu. The under layer 114, the cap layer 112, and the nonmagnetic spacer 104 may be conductive nonmagnetic materials, which may be single metals such as Ta, Cr, Cu, Pt, Ag, Rh, or Ru, or laminated structures. The film thicknesses may be set arbitrarily so as to obtain high characteristics of the magnetic recording head. The FGL 102 in the example is $Co_{50}Fe_{50}$ and has a film thickness of 10 nm. A material having high saturation magnetization is preferably used for the FGL 102; for example, a CoFe alloy or the like may be used. A so-called Heusler material having high spin polarizability may be used, and Co/Fe multilayer film or Co/Ni, Co/Pd, Co/Pt, Fe/Pt, or the like having positive and negative vertical magnetic anisotropy fields may be used. A combination of these materials may also be used. The film thickness of the FGL 102 is preferably about 4 nm or greater from the standpoint of obtaining high AC field strength. The track width and the element height of the STO 1008 are both 40 nm. The main pole 1010 is a CoFe alloy having an Ms of 2.4 T, a track width of 60 nm, and a film thickness of 300 nm. The trailing shield 1014 is an NiFe alloy having an Ms of 1.2 T. The geometrical dimensions of these STO 1008 and recording head parts are not specifically limited, and may be designed arbitrarily so as to obtain high field strength and a high field gradient from the STO 1008 and the recording head 1002.

Figure 11:
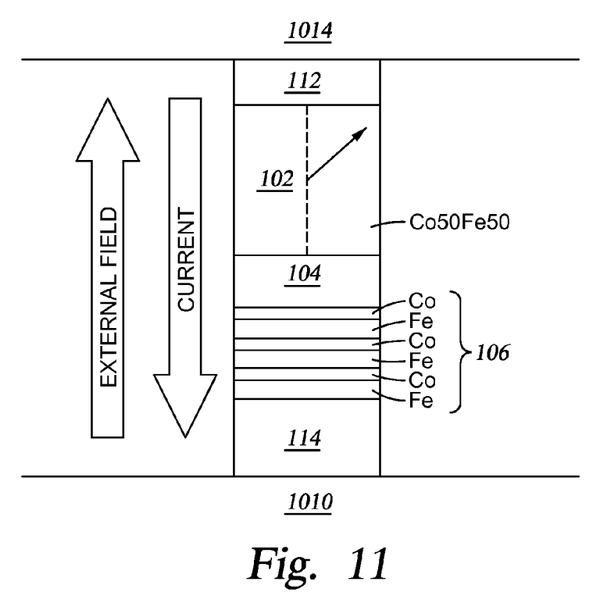
FIG. 11 is a schematic illustration of a MAMR head structure according to another embodiment.

Specifically, the SPL 106 of the present structural example may have the structure shown in FIG. 11. The SPL 106 is $[Co_3/Fe_7]_3$ described in Table 1. This material is a laminated structure of seven periods of 3-Å Co and 8-Å Fe, and has a film thickness of 3 nm. The Bs is 2.35 T, and the Hk is −7 kOe. Using such a structure obtains effects such as described above.

Figure 12:
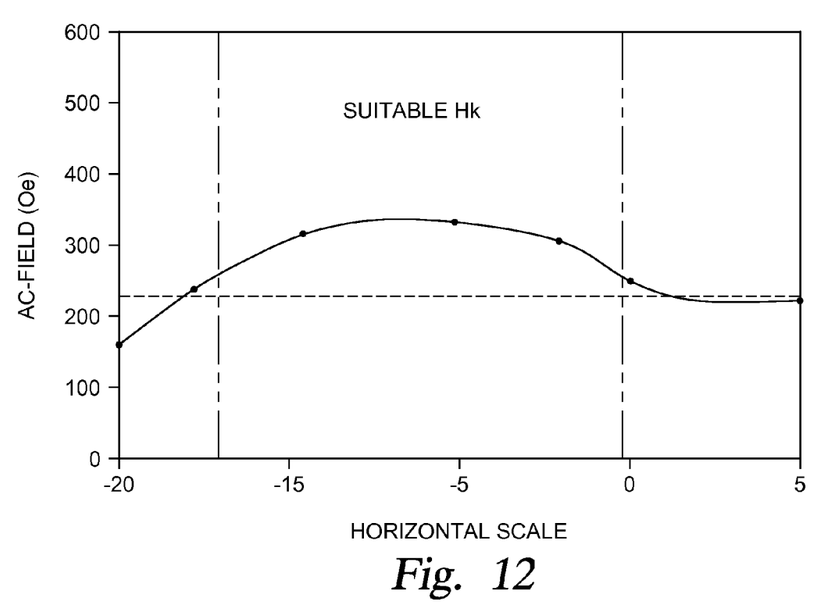
FIG. 12 is a graph illustrating the AC field vs. Hk of SPL.

The optimum range of Hk of the SPL 106, which is a feature of the structure, will be described using the relationship between AC field strength and the Hk of the SPL 106 shown in FIG. 12. The AC field strength starts to increase as the Hk of the SPL 106 becomes about 0 kOe or lower and reaches a peak at about −7 kOe, after which, the AC field strength drops as the Hk of the SPL 106 decreases further. FIG. 12 reveals that keeping the Hk of the SPL 106 in a range of less than 0 kOe and −17 kOe or greater obtains an effect improving the AC field. The reason that the AC field strength drops when the Hk of the SPL 106 is too low is that too low an Hk produces too strong a force binding the magnetization of the SPL 106 in-plane, which tends to stop oscillation of the SPL 106 and effectively reduces the spin torque acting on the FGL 102. The optimum range of the Hk of the SPL 106 does not greatly vary even when conditions differ, such as the material and film thickness of the FGL 102, and the film thicknesses of the nonmagnetic spacer and the SPL 106. Therefore, keeping the Hk of the SPL 106 in a range of less than 0 kOe and −17 kOe or greater obtains an AC field improving effect.

The laminated film of $[Co_a/Fe_b]$, $Co_{1-x}Ir_x$ alloy, and $Fe_{1-x}C_x$ alloy described in Tables 1, 2, 3, and 4 can be used as materials for realizing this optimum Hk of the SPL 106. The composition ratio a/b of Co and Fe in the laminated film of $[Co_a/Fe_b]$ must be in a range of 0.25 to 0.4, and the period (a+b) must be in a range of 15 to 40 Å. Tables 1 and 2 show examples of structures in which a Co/Fe multilayer film obtains the required Hk. The composition ratio of Ir in the $Co_{1-x}Ir_x$ alloy must be 8-38%, and the composition ratio of C in the $Fe_{1-x}C_x$ alloy must be 1.5-8%. Applying these materials for the SPL can keep the Hk of the SPL in a range of less than 0 kOe and −17 kOe, which improves AC field strength.

Figure 13:
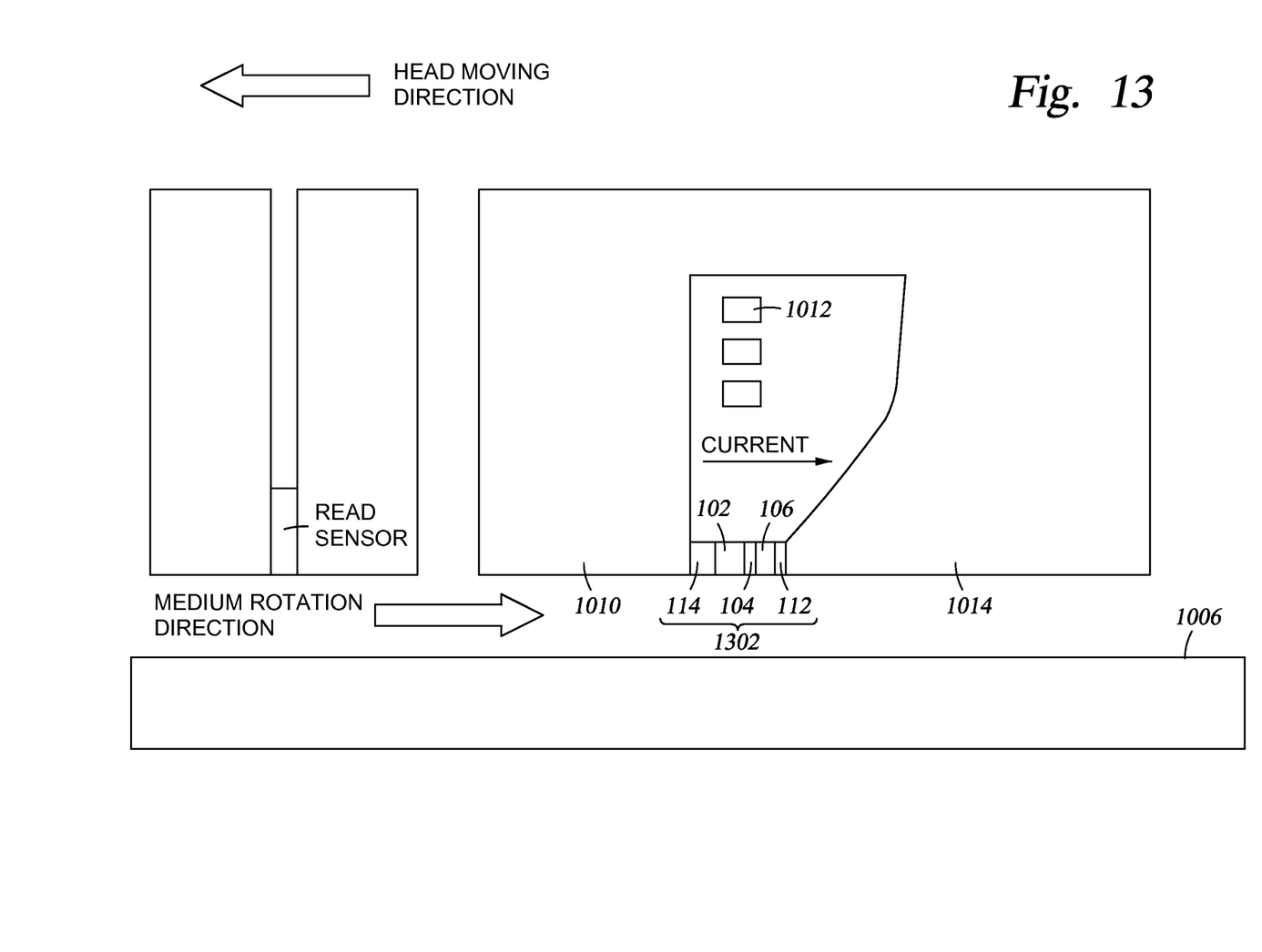
FIG. 13 is a schematic illustration of a MAMR head structure according to another embodiment.

FIG. 13 shows another example of the structure according to one embodiment. The only difference between the present structural example and the structure shown in FIGS. 3 and 8 is that the lamination order of the SPL 106, the spacer 104, and the FGL 102 of the STO 1302 differs. Where the lamination order of the STO 1302 in the structure shown in FIGS. 3 and 8 was SPL 106, Cu, and FGL 102 in this order from the main pole 1010 side, the lamination order in the structure shown in FIG. 13 is FGL 102, spacer 104, and SPL 106 in this order from the main pole 1010 side. Both structures have an equivalent effect improving the AC field, by making the Hk of the SPL 106 negative. The FGL 102 can be brought near the main pole 1010 in the present structural example, which has the characteristic of obtaining a high effect improving the effective recording field by applying an AC field in a location having high recording field strength.

By utilizing an STO having an SPL with a smaller thickness than the FGL, the STO is capable of generating a high AC field by as low a current as possible.

While the foregoing is directed to embodiments, other and further embodiments of the invention may be devised without departing from the basic scope thereof, and the scope thereof is determined by the claims that follow.

What is claimed is:

1. A MAMR head, comprising:
 a main pole;
 a trailing shield; and
 an STO coupled between the main pole and the trailing shield, wherein the STO includes:
  a first nonmagnetic layer;
  a first magnetic layer having a first thickness, wherein the first magnetic layer is coupled to the first nonmagnetic layer, wherein the first magnetic layer comprises a laminate structure containing FeCo alloy;
  a non-magnetic spacer layer coupled to the first magnetic layer;
  a second magnetic layer having a second thickness and coupled to and in direct contact with the non-magnetic spacer layer, wherein the second magnetic layer is a single layer, wherein the first thickness is greater than the second thickness, wherein a current is charged from the first magnetic layer to the second magnetic layer, and wherein a vertical magnetic anisotropy field of the second magnetic film is less than 0 kOe, and
  a second non-magnetic layer in direct contact with the second magnetic layer.

2. The MAMR head of claim 1, wherein the first magnetic layer is located closer to the main pole than the second magnetic layer.

3. The MAMR head of claim 1, wherein the second thickness is 4.0 nm to 0.6 nm.

4. The MAMR head of claim 1, wherein the second magnetic layer is selected from the group consisting of $Co_{1-x}Ir_x$ where x=8-38 at % and $Fe_{1-y}C_y$ where y=1.5-8 at %.

5. The MAMR head of claim 1, wherein the vertical anisotropy field of the second magnetic layer is between 0 kOe and −17 kOe.

6. The MAMR head of claim 5, wherein the first magnetic layer is located closer to the main pole than the second magnetic layer.

7. The MAMR head of claim 5, wherein the second thickness is 4.0 nm to 0.6 nm.

8. The MAMR head of claim 7, wherein the first magnetic layer is located closer to the main pole than the second magnetic layer.

9. The MAMR head of claim 5, wherein the second magnetic layer is selected from the group consisting of $Co_{1-x}Ir_x$ where x=8-38 at % and $Fe_{1-y}C_y$ where y=1.5-8 at %.

10. The MAMR head of claim 9, wherein the first magnetic layer is located closer to the main pole than the second magnetic layer.

11. The MAMR head of claim 10, wherein the first thickness is between about 4.0 nm and about 10 nm.

12. The MAMR head of claim 11, wherein the non-magnetic spacer layer comprises copper.

13. The MAMR head of claim 9, wherein the second thickness is 4.0 nm to 0.6 nm.

14. The MAMR head of claim 13, wherein the first thickness is between about 4.0 nm and about 10 nm.

15. The MAMR head of claim 14, wherein the first magnetic layer is located closer to the main pole than the second magnetic layer.

* * * * *